(12) United States Patent  (10) Patent No.: US 9,560,254 B2
Lombardi et al.  (45) Date of Patent: Jan. 31, 2017

(54) METHOD AND APPARATUS FOR ACTIVATING A HARDWARE FEATURE OF AN ELECTRONIC DEVICE

(71) Applicant: GOOGLE TECHNOLOGY HOLDINGS LLC, Mountain View, CA (US)

(72) Inventors: Michael J. Lombardi, Lake Zurich, IL (US); Amber M. Pierce, Evanston, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/143,818

(22) Filed: Dec. 30, 2013

(65) Prior Publication Data

US 2015/0189178 A1  Jul. 2, 2015

(51) Int. Cl.
| | |
|---|---|
| *H04N 5/225* | (2006.01) |
| *H04N 5/232* | (2006.01) |
| *G06F 3/01* | (2006.01) |
| *G06F 1/16* | (2006.01) |
| *G06F 3/00* | (2006.01) |

(52) U.S. Cl.
CPC .......... *H04N 5/2258* (2013.01); *G06F 1/1694* (2013.01); *G06F 3/00* (2013.01); *G06F 3/017* (2013.01); *H04N 5/232* (2013.01); *H04N 5/23219* (2013.01); *H04N 5/23245* (2013.01); *H04N 5/23258* (2013.01); *H04R 2499/11* (2013.01)

(58) Field of Classification Search
CPC .... G06F 3/017; G06F 1/1694; H04N 5/23258; H04N 5/23245
See application file for complete search history.

(56) References Cited

U.S. PATENT DOCUMENTS

| | | | |
|---|---|---|---|
| 8,497,884 B2 | 7/2013 | Cholewin et al. | |
| 2006/0239517 A1 | 10/2006 | Creasey et al. | |
| 2010/0208057 A1* | 8/2010 | Meier | G06T 7/0046 348/135 |
| 2010/0214216 A1* | 8/2010 | Nasiri | A63F 13/06 345/158 |
| 2012/0276947 A1 | 11/2012 | Smith | |
| 2012/0281129 A1 | 11/2012 | Wang et al. | |

(Continued)

OTHER PUBLICATIONS

Jonathan S. Geller, "Motorola Moto X Review", http://bgr.com/2013/08/08/motorola-moto-x-review/, Aug. 8, 2013, 14 pages.

(Continued)

*Primary Examiner* — Paul Berardesca
(74) *Attorney, Agent, or Firm* — McDermott Will & Emery LLP (57) ABSTRACT

A method and apparatus for activating a hardware feature of an electronic device includes the electronic device detecting 302 a predetermined motion of the electronic device and measuring 304, in response to detecting the predetermined motion, an orientation of the electronic device. The method further includes the electronic device activating 306, based on the orientation, a hardware feature from a plurality of selectable hardware features of the electronic device, wherein each selectable hardware feature can be activated based on different orientations of the electronic device.

7 Claims, 9 Drawing Sheets

(56) References Cited

U.S. PATENT DOCUMENTS

| | | | |
|---|---|---|---|
| 2013/0191741 A1* | 7/2013 | Dickinson | G06F 1/163 715/702 |
| 2013/0215153 A1 | 8/2013 | Park et al. | |
| 2013/0258122 A1* | 10/2013 | Keane et al. | 348/208.4 |
| 2013/0258129 A1* | 10/2013 | Burns | 348/222.1 |
| 2013/0285906 A1* | 10/2013 | Jeon et al. | 345/158 |
| 2015/0077381 A1* | 3/2015 | Park | G06F 3/013 345/174 |

OTHER PUBLICATIONS

Thrystan, "Samsung Galaxy S IV Design Places the Front Camera at the Bottom", http://www.concept-phones.com/samsung/samsung-galaxy-iv-design-places-front-camera-bottom/, Mar. 7, 2013, 4 pages.

Daniel Perez, "Sony Xperia ZL Review", http://www.ubergizmo.com/2013/06/sony-xperia-zl-review/, Jun. 25, 2013, 11 pages.

\* cited by examiner

METHOD AND APPARATUS FOR ACTIVATING A HARDWARE FEATURE OF AN ELECTRONIC DEVICE

FIELD OF THE DISCLOSURE

The present disclosure relates generally to activation of a hardware feature of an electronic device and more particularly to selecting a hardware feature of an electronic device for activation based on an orientation of the electronic device.

BACKGROUND

Electronic devices, such as smartphones and tablets, continue to evolve through increasing levels of performance and functionality as manufacturers design feature-rich products that offer consumers greater convenience and productivity. Today, a single smartphone can operate as a phone, two-way radio, media player, web browser, navigation system, camera, videocamera, videophone, personal digital assistant, gaming device, and remote control where separate, dedicated devices would have been required at the turn of the century.

As the number of selectable hardware features packed into electronic devices increase, so does the complexity of user interfaces used to activate the hardware features. In a given situation, or at a given time, a user navigates his way through menus or other organizational constructs of a user interface to physically tap an icon that selects a desired hardware feature from those that are available. This is especially true where the device is unable to anticipate the needs of the user. Selecting hardware features by hand in this way has numerous drawbacks.

In some instances, a user might not have a free hand with which to select a hardware feature for activation on an electronic device. In other instances, the extra steps involved in navigating menus and tapping icons are an inconvenience. For a particular case where a fleeting photo opportunity presents itself, a user may not have enough time to transition from a default camera to an alternate camera better suited to capture the action.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order presented. It will be further appreciated that certain actions and/or steps may be described or depicted in a particular order of occurrence while those skilled in the art will understand that such specificity with respect to sequence is not actually required.

The apparatus and method components have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure describes an apparatus in the form of an electronic device that performs a method for selecting a hardware feature of the electronic device based on the orientation of the electronic device. In accordance with the teachings herein, one such electronic device includes a first camera located on a first side of the electronic device at a first height above a bottom of the electronic device and a second camera located on a second side of the electronic device at a second height above the bottom of the electronic device, wherein the second height is different than the first height. The electronic device also includes a first sensor configured to detect a motion of the electronic device and a second sensor configured to measure an orientation of the electronic device. A processing element of the electronic device is operationally coupled to the first and second sensors and the first and second cameras, wherein the processing element is configured to select a camera from the first and second cameras based on the orientation of the electronic device measured in response to detecting a predetermined motion.

In a first embodiment, the first sensor is a gyroscope and the predetermined motion is rotational motion resulting from twisting the electronic device. In a second embodiment, the second sensor is an accelerometer that measures the orientation of the electronic device relative to a gravitational direction and the processing element is configured to select the first camera instead of the second camera when the first camera is above the second camera relative to the gravitational direction. The processing element is also configured to select the second camera instead of the first camera when the second camera is above the first camera relative to the gravitational direction.

For a third embodiment, the second sensor is an accelerometer that measures the orientation of the electronic device relative to a gravitational direction, wherein the orientation is quantified by an orientation angle between the gravitational direction and a reference line pointing from a first location of the first camera to a second location of the second camera. The processing element is configured to select the first camera instead of the second camera when the orientation angle is less than a threshold angle, and the processing element is configured to select the select the second camera instead of the first camera when the orientation angle is greater than the threshold angle.

In a fourth embodiment, the second sensor includes a contact sensor on the second side the electronic device configured to measure the orientation of the electronic device relative to a grip on the electronic device. The processing element is configured to select the first camera instead of the second camera when the contact sensor detects the grip on the second side of the electronic device.

In a fifth embodiment, the second sensor includes a set of contact sensors on at least one edge of the electronic device configured to measure the orientation of the electronic device relative to a grip on the electronic device. The processing element is configured to select the first camera instead of the second camera when the set of contact sensors detects a first grip on the at least one edge of the electronic device, or select the second camera instead of the first camera when the set of contact sensors detects a second grip on the at least one edge of the electronic device.

For a sixth embodiment, the second sensor is the first camera that measures the orientation of the electronic device relative to a nearest human face detected by the first camera. The processing element is configured to select the first camera instead of the second camera upon the occurrence of at least one of a distance between the first camera and the nearest human face as measured by an autofocus feature of the first camera is greater than a threshold distance, or an angle subtended by the nearest human face relative to the first camera is less than a threshold angle.

Figure 2:
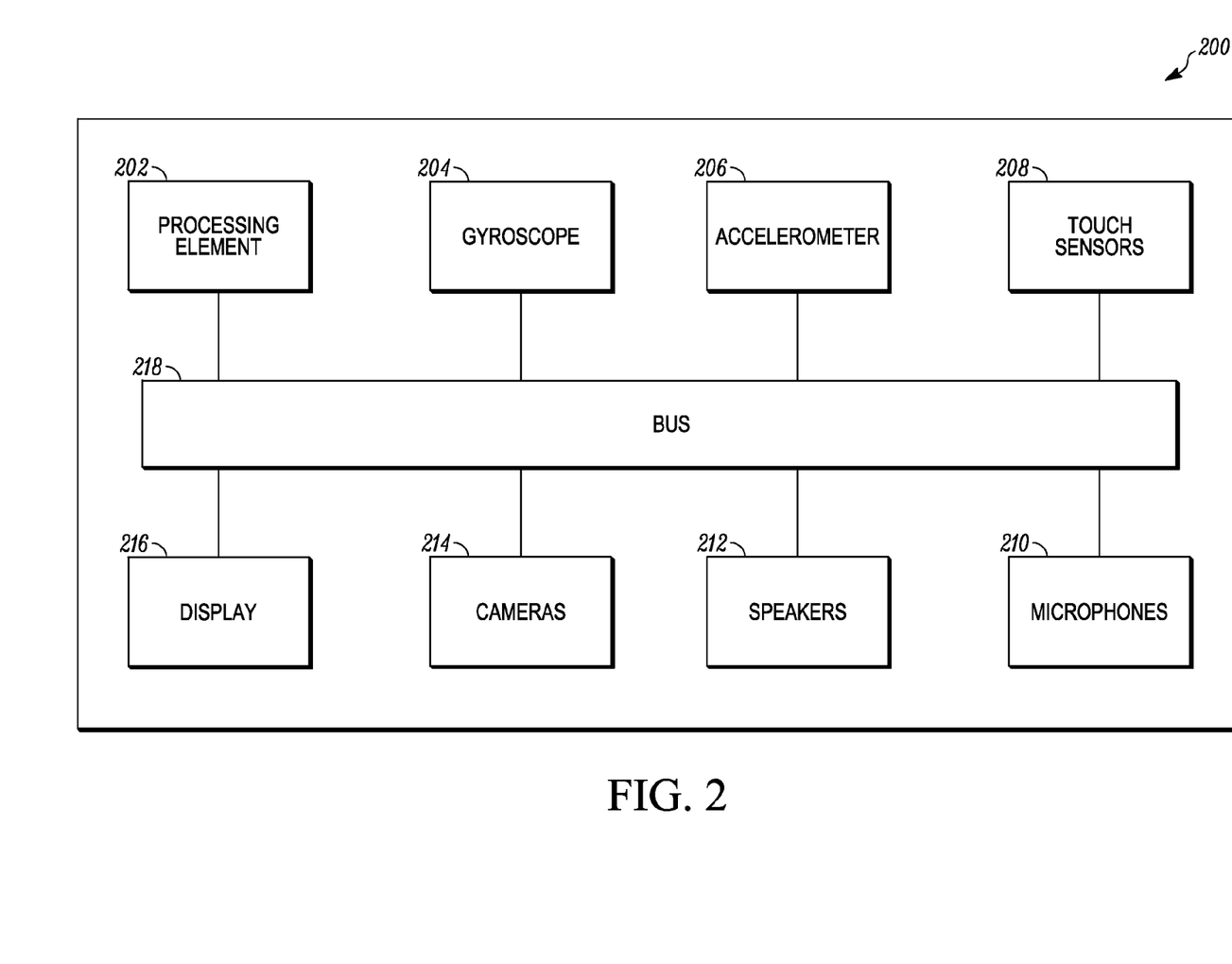
FIG. 2 is a schematic diagram of an electronic device in accordance with some embodiments of the present teachings.

In a seventh embodiment, the second sensor is the first camera that measures the orientation of the electronic device relative to a nearest human face detected by the first camera. The processing element 202 is configured to select the first camera instead of the second camera if an image of the nearest human face detected by the first camera is up-side down.

Also in accordance with the teachings herein, is a method performed by an electronic device for activating a hardware feature of the electronic device that includes the electronic device detecting a predetermined motion of the electronic device and measuring, in response to detecting the predetermined motion, an orientation of the electronic device. The method further includes the electronic device activating a hardware feature from a plurality of selectable hardware features of the electronic device based on the orientation of the electronic device, wherein each selectable hardware feature can be activated based on different orientations of the electronic device.

Figure 1:
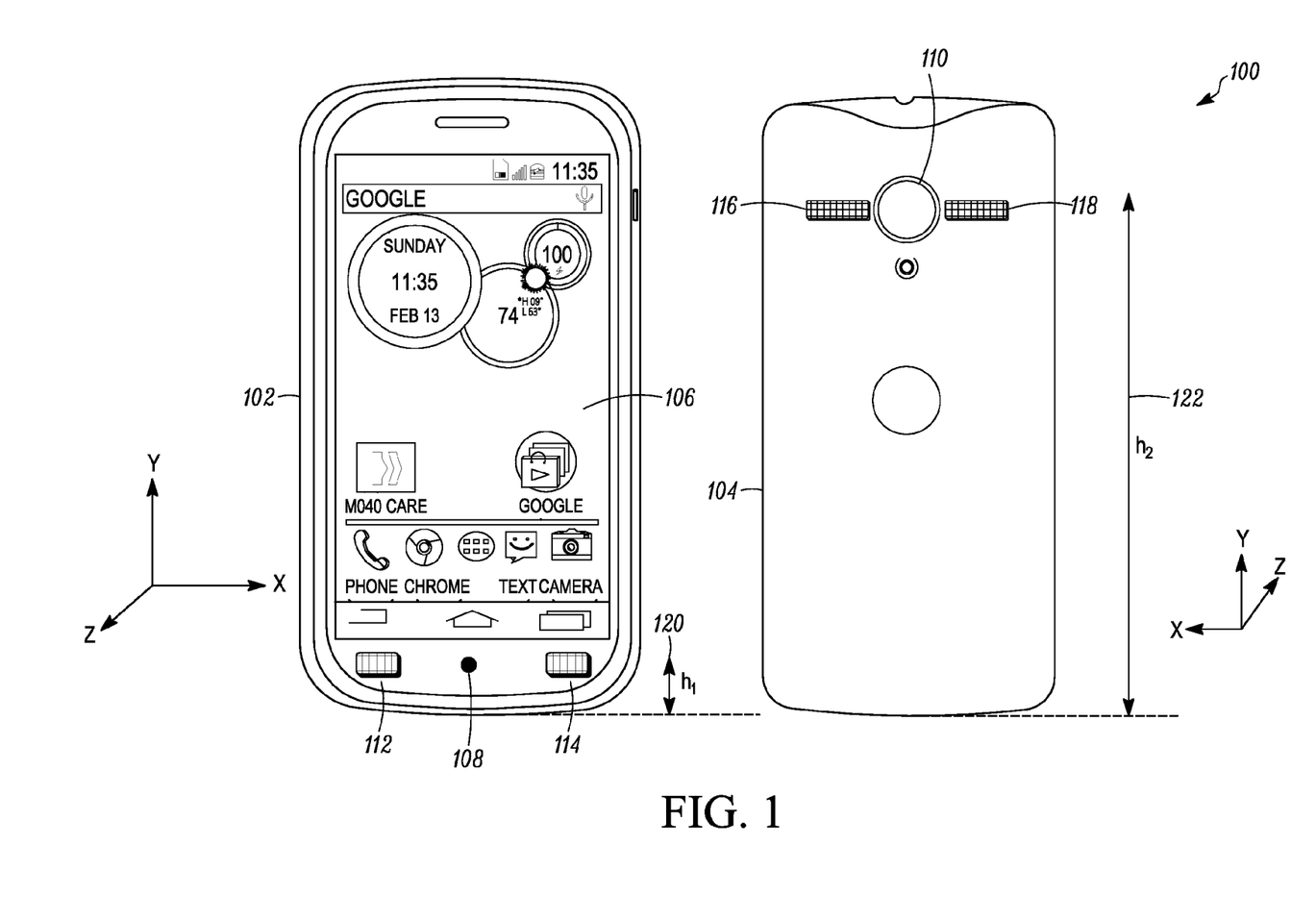
FIG. 1 is a diagram illustrating a front and back view of an electronic device in accordance with some embodiments of the present teachings.

Referring now to the drawings, and in particular FIG. 1, a diagram of an electronic device (also referred to herein simply as a "device") having selectable hardware features is shown and indicated generally at 100. The device 100 is portrayed in two views, a front view 102 and a back view 104, with each view showing selectable hardware features of the device 100. The front view 102 of the device 100 shows a display 106, a first camera 108 (also referred to herein as the front or forward-facing camera), and a first set of speakers (also referred to herein as the front speakers) that includes a left 112 and right 114 stereo speaker. The back view 104 of the device 100 shows additional hardware features, namely a second camera 110 (also referred to herein as the back or rearward-facing camera) and a second set of speakers (also referred to herein as the back speakers) that includes a left 118 and right 116 stereo speaker. The front and back sides of the device 100 are also referred to herein as the first and second sides, respectively.

While a smartphone is shown at 100, no such restriction is intended or implied as to the type of device that can be adapted or configured to utilize the present teachings to activate a selectable hardware feature of the device. Other suitable devices include, but are not limited to: phablets; tablets; personal digital assistants (PDAs); portable media players (e.g., MP3 players); electronic book readers; personal global-positioning-system (GPS) receivers; and wearable electronic devices, such as devices worn with a wristband or armband. As used herein, an electronic device is an apparatus that operates by manipulating the flow of electrons using one or more semiconductors. A selectable hardware feature of an electronic device is defined herein as a physical element or a set of physical elements of the device that can be electronically activated for use by the device and that assists the device in performing its intended functionality when activated. As used herein, a set is defined as having one or more elements.

A hardware feature is selectable in that it represents one of a plurality of hardware features of a device that that can be selected for activation by the device over other hardware features of the plurality of hardware features. The front 108 and back 110 cameras, for example, are selectable hardware features of the device 100. The front camera 108 can be electronically activated for use by the device 100 while the back camera 110 remains inactive. Similarly, the set of front stereo speakers 112, 114 of the device 100 can be selectively activated over the set of back stereo speakers 116, 118.

For both views of the device 100, a right-handed Cartesian coordinate system is shown and used in referencing directions. The coordinate system is attached to the device 100 so that an "x" and "y" axis both lie in a plane defined by the display 106 of the device 100, with the "y" axis pointing from a bottom of the device 100 toward the top of the device 100. The "z" axis is directed outward from the plane defined by the display 106 of the device 100. In the "y" direction, the first camera 108 is located at a height $h_1$ 120 just above the bottom of the device 100 while the second camera 110 is located at a height $h_2$ 122 near the top of the device 100. The locations of selective hardware features on the device 100 an relative to each other play a role in some embodiments with regard to which selective hardware feature the device 100 selects for activation.

Referring to FIG. 2, a block diagram illustrating some elements of an electronic device in accordance with embodiments of the present teachings is shown and indicated generally at 200. For one embodiment, the block diagram 200 represents some of the elements of the device 100. Specifically, the block diagram 200 shows: a processing element 202; a gyroscope 204, an accelerometer 206, touch sensors 208, microphones 210, speakers 212, cameras 214, and a display 216 which are all operationally interconnected by a bus 218.

A limited number of device elements 202, 204, 206, 208, 210, 212, 214, 216 and 218 are shown at 200 for ease of illustration, but other embodiments may include a lesser or greater number of such elements in a device. Moreover, other elements, such as memory and communication ports, generally needed for a commercial embodiment of a device that incorporates the elements shown at 200 are omitted from FIG. 2 for clarity in describing the enclosed embodiments.

We turn now to a brief description of the device elements shown in the block diagram 200. In general, the processing element 202, the gyroscope 204, the accelerometer 206, and the touch sensors 208 are configured with functionality in accordance with embodiments of the present disclosure as described in detail below with respect to the remaining FIGS. 3-9. "Adapted," "operative," or "configured," as used herein, means that the indicated elements are implemented using one or more hardware devices such as one or more operatively coupled processing cores, memory elements, and interfaces, which may or may not be programmed with software and/or firmware as the means for the indicated elements to implement their desired functionality. Such functionality may be supported by the other hardware shown in FIG. 2, including the device elements 210, 212, 214, 216, and 218.

The processing element 202, for instance, includes arithmetic logic and control circuitry necessary to perform the digital processing, in whole or in part, for the electronic device 100 to select a selectable hardware feature for activation based on the orientation of the device 100. For one embodiment, the processing element 202 represents a primary microprocessor, also referred to as a central processing unit (CPU), of the electronic device 100. For example, the processing element 202 can represent an application processor of a smartphone. In another embodiment, the processing element 202 is an ancillary processor, separate from the CPU, wherein the ancillary processor is dedicated to providing the processing capability, in whole or in part, needed for the device elements of the block diagram 200 to perform at least some of their intended functionality.

The device 100 uses the gyroscope 204, either by itself or in combination with other elements, to detect motion, specifically angular motion of the device 100 about an axis that may or may not pass through the device 100. For some embodiments, the device 100 uses the gyroscope 204, and any supporting elements, to detect angular displacement, angular velocity, angular acceleration, and/or angular jerk for the device 100. Angular velocity, angular acceleration, and angular jerk are defined as the first, second, and third time derivatives of angular displacement, respectively. In other embodiments, the device 100 uses the accelerometer 206 and/or additional elements (not shown) to detect linear motion of the device 100, which may include, but is not limited to, linear displacement, linear velocity, liner acceleration, and/or linear jerk. In further embodiments, the device 100 detects angular and/or linear motion representing higher-order time derivatives of angular and/or linear displacement, respectively.

The device 100 also uses the accelerometer 206 to determine a gravitational direction with respect to itself, or equivalently, its orientation with respect to the gravitational direction. The gravitational direction for a device is defined as the direction in which a gravitational field points at a location of the device. The gravitational direction is the direction in which the weight of the device 100 is directed, also referred to herein as the "downward" direction or the direction of gravity. For a specific embodiment, the accelerometer 206 is a multi-axis accelerometer that is capable of resolving an acceleration of the device 100 into different spatial or angular components.

The device 100 uses the touch sensors 208 to determine an orientation of the device 100 with respect to a grip on the device 100. A grip on the device 100, as used herein, refers to how the device 100 is being held by a user, which may involve a single hand or both hands of the user holding the device 100. Parts of a user's hand that are in contact with the device 100, and detectable by the device 100 in different embodiments, include, but are not limited to, individual fingers, fingers grouped together, a thumb, a smallest "pinky" finger, a palm, and/or the fleshy part of the hand between the thumb and palm.

For a specific embodiment, the touch sensors 208 are capacitive sensors placed on or within a display, housing, or shell of the device 100 in different locations. The touch sensors detect changes in capacitance as a user, or more specifically the user's hand, comes in contact with the device 100. In another embodiment, the device 100 uses pressure sensors as the touch sensors 208. For example, the device uses sensors that include a piezoelectric material that generates a detectable voltage when pressure from a user's grip is applied to the sensors. Touch sensors 208 used by the device 100 can also include, but are not limited to, piezoresistive and electroresistive sensors. Further, in an additional embodiment, the device 100 uses a combination of different sensors of varying type to detect tactile contact with the device 100.

A touch sensor of a specific type might be well suited for a particular location on the device 100 based on a type of contact that is expected at that location. For example, the backside of the device 100 is cradled in the palm of a user's hand as the user views the display 106 on the front of the device 100. Where the user's hand is cupped, the device 100 does not usually detect direct contact on the rear surface. By placing a photosensor on the back of the device 100, the cupped hand might be inferred from a decrease in light reaching the photosensor. In one embodiment, an additional photosensor is placed on the front of the device 100. By comparing the intensity of light reaching each photosensor, the device 100 distinguishes a cradling palm-grip, where only the back photosensor detects diminished light, from a dark environment, where both photosensors detect diminished light.

The microphones 210, speakers 212, and cameras 214 represent additional or alternative selectable hardware features of the device 100 that are selectively activated by the device 100 based on an orientation of the device 100 measured in response to a detected predetermined motion. For some embodiments, the device 100 selects and activates a hardware feature from a plurality of selective hardware features that perform similar or identical base functions, but do so in different ways. For example, both the front 112, 114 and back 116, 118 set of stereo speakers for the device 100 output audio, however, each set is configured to meet a different need of a user. If the user wishes to personally listen to audio from the device 100, the front set of speakers 112, 114 are smaller and consume less power. The back speakers 116, 118 are larger and capable of outputting higher decibel levels, better suited for use when a small group of people are all listening to the device 100.

The front 108 and back 110 cameras of the device 100 each give the device 100 the ability to capture images. The front camera 108 is better suited for a user taking a picture of himself. This is because the user is able to focus the front camera 108 on himself while being able see the images displayed on the display 106 by a viewfinder application.

The user uses the back camera 110, which for an embodiment has greater resolution than the front camera 108, to capture images of landscapes and other people.

For one embodiment, the device 100 includes two sets of microphones (not shown) configured to record sound in different ways. A first set of microphones, for example, includes multiple microphones that can record stereo tracks and/or receive multiple audio signals to perform noise reduction. A second set of microphones is limited to a single microphone with lower fidelity that consumes less power while still being sufficient for simple voice recordings or communication. In another embodiment, the first set of microphones is configured for near-field recording while the second set of microphones is configured for far-field recording.

Selectable hardware features of the device 100 need not be limited to a pair. For some embodiments, the device 100 can select from and activate one of a larger number of selectable hardware features. For example, the device 100 might include a third camera configured for capturing macroscopic images. In a particular embodiment, a plurality of selectable hardware features for the device 100 includes at least one of: a first set of speakers and a second set of speakers, a first set of microphones and a second set of microphones, a first display and a second display, or a first side of a wraparound display and a second side of the wraparound display.

The device 100 uses the display 216, which for an embodiment is the display 106, to present information or content for viewing. In some embodiments, the display 216 also functions as an input device (e.g., a touchscreen). The display 216 can also serve as a point of reference for the orientation of the device with respect to a specific direction or object. For example, the display 106 indicates a front side of the device 100, and the device 100 may be orientated with its display 106 facing the ground (normal to the gravitational direction) or facing a user in an upright orientation (parallel to the gravitational direction).

Figure 3:
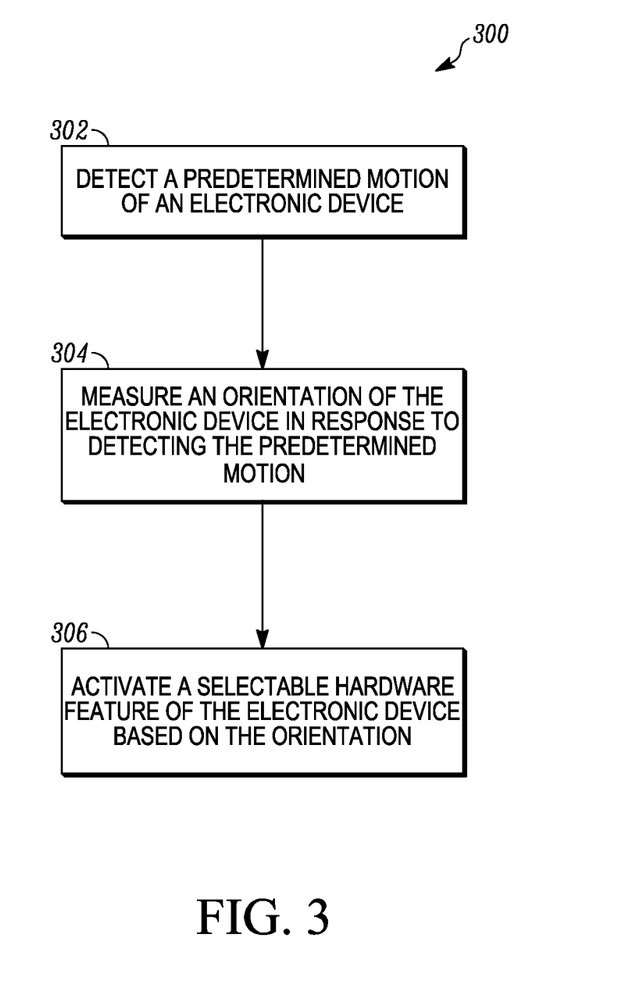
FIG. 3 is a logical flow diagram illustrating a method for activating a hardware feature on an electronic device in accordance with some embodiments.

We turn now to a detailed description of the functionality of the device elements shown in FIGS. 1 and 2, at 100 and 200, respectively, in accordance with the teachings herein and by reference to the remaining figures. FIG. 3 is a logical flow diagram illustrating a method 300 performed by the device 100 for activating a selectable hardware feature or set of selectable hardware features. In performing the method 300, the device 100 detects 302, using the gyroscope 204 and/or other motion-sensing elements, a predetermined motion for the device 100. A predetermined motion, as used herein, is a specific motion of the device 100 that results from the application of one or more forces on the device 100. Such forces can be applied by a user of the device 100 who purposefully moves the device 100 in a particular way while holding it.

A motion is predetermined if the device 100 has the capability of detecting the occurrence of the motion and distinguishing it from other motions that may or may not be predetermined motions themselves. For an embodiment, the device 100 detecting a predetermined motion triggers the device 100 to activate a selectable hardware feature. In an embodiment having multiple predetermined motions, the device 100 detecting a first predetermined motion triggers the device 100 to activate a first hardware feature from a first set of selectable hardware features, and the device 100 detecting a second predetermined motion that is different from the first triggers the device 100 to activate a second hardware feature from a second set of selectable hardware features. To detect and distinguish a predetermined motion from other motions, the device uses sensor data and stored parameters.

For one embodiment, the device 100 stores parameter data in volatile or non-volatile memory used by the device 100, the parameter data quantitatively characterizing one or more aspects of a predetermined motion. The device 100 compares the parameter data in real time against data collected by one or more sensors for the device 100, such as the gyroscope 204. For example, the device 100 detects that it is moving and the gyroscope 204 determines the motion includes an angular displacement having a first measured value and an angular acceleration having a second measured value. The device 100 then compares the first and second measured values against parameter data for a predetermined motion stored as tabulated values in memory. If the device 100 determines that both the first and second measured values fall within a range of values specified by the parameter data for the predetermined motion, then the device 100 determines that the predetermined motion occurred.

In a further embodiment, the processing element 202 of the device 100 statistically determines, for example by using an algorithm to perform a calculation, a confidence score for how closely measured values for a detected motion agree with stored parameter values for a predetermined motion. The confidence score may depend on binary determinations of whether measured values fall inside or outside quantitative ranges established for the predetermined motion, or the calculation of the confidence score may depended on weighted quantities that reflect how close the measured values are to ideal values tabulated for the predetermined motion. For one embodiment, the device 100 tabulates ideal values for a predetermined motion for a specific user while in a training mode. If the determined confidence score is greater than a threshold score, the device 100 determines the detected motion is the predetermined motion. In some embodiments, a predetermined motion includes or is characterized by separate sub-motions that occur in immediate succession or within a short time interval of one another. Such a compound predetermined motion is illustrated in FIG. 4.

Figure 4:
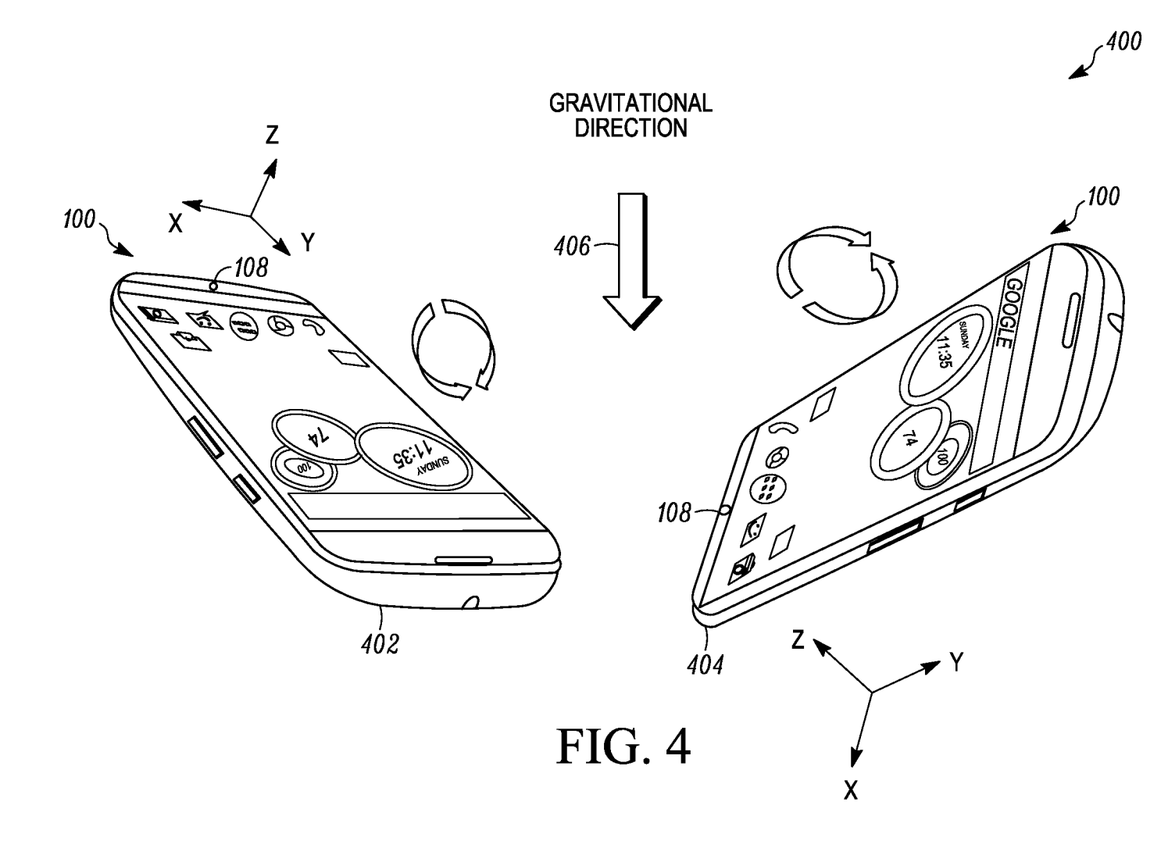
FIG. 4 is a diagram illustrating a predetermined motion of an electronic device in accordance with some embodiments of the present teachings.

FIG. 4 shows a diagram 400 that illustrates the device 100 undergoing a motion that includes a double rotation for two orientations of the device 100. The motion indicated at 402 and 404 includes separate rotations of the device 100 about its "y" axis, one in a clockwise direction and one in a counterclockwise direction for each orientation 402, 404. Two embodiments reflect the two permutations of the oppositely directed rotations in terms of which rotation the device 100 undergoes first. A user holding the device 100, for example, might rotate his forearm, together with the hand in which he is holding the device 100, in a clockwise direction, as though he were twisting a screwdriver to advance a screw. After rotating the device 100 in the clockwise direction, the user rotates the device 100 in the counterclockwise direction back to its original position. This type of motion is referred to herein as a "screwdriver" motion.

A screwdriver motion can be characterized by parameters that include angular displacement, angular velocity, angular acceleration, angular jerk, and the number of times a rotation is reversed. For an embodiment, including a reversal of direction and an angular jerk above a threshold value in a predetermined screwdriver motion helps the device 100 distinguish a deliberate (done with willful or purposeful intent) motion caused by a user twisting the device 100 from a random motion occurring as a result of the device 100 being carried. Additional variations for a screwdriver motion include a precession of the device 100 about an axis that does not lie in the "x"-"y" plane of the device 100.

Figure 5:
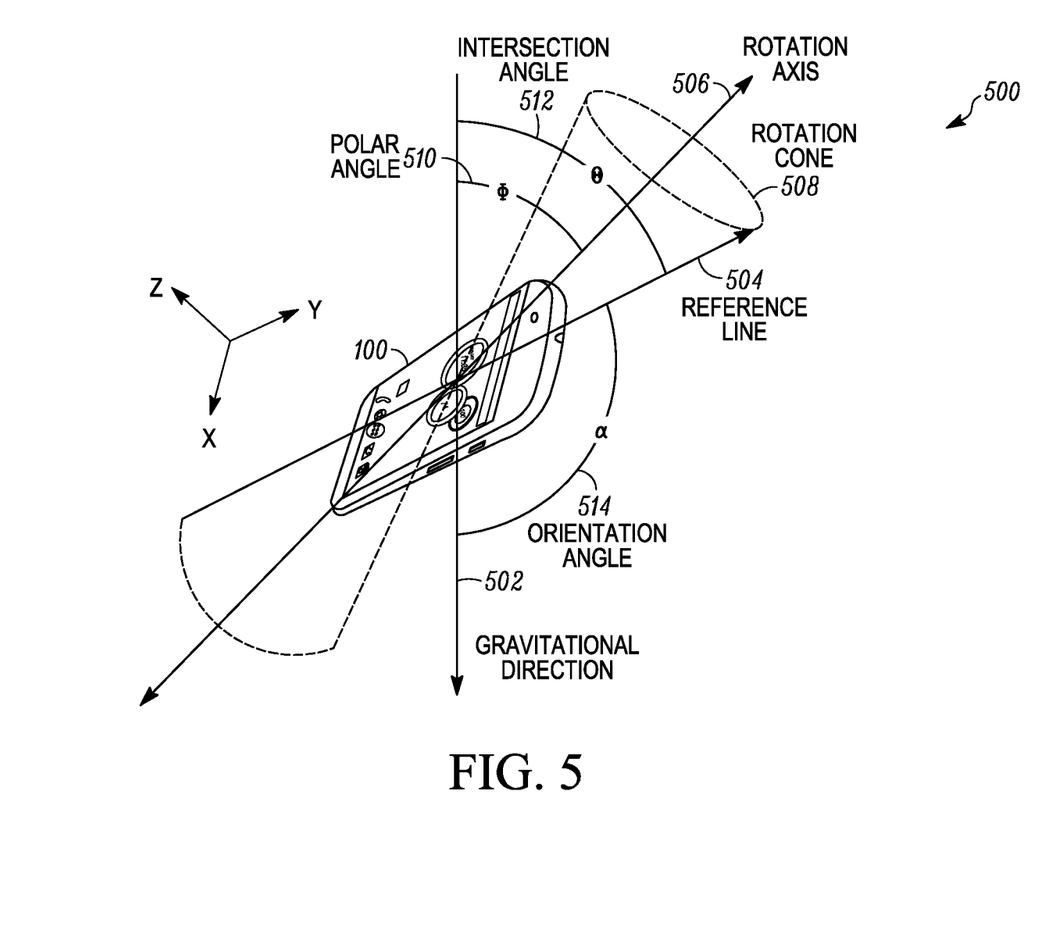
FIG. 5 is a diagram illustrating an orientation of an electronic device in accordance with some embodiments of the present teachings.

FIG. 5 is a diagram 500 illustrating an orientation of the electronic device 100 as it undergoes a screwdriver motion while precessing about a rotation axis 506. More specifically, the diagram 500 shows the device 100 being rotated about the rotation axis 506, which is not aligned with the "y" axis for the device 100 and which makes a polar angle 510 with a gravitational direction 502. The rotation axis 506 does, however, pass through the device 100 as indicated in the diagram 500. As a user rotates the device 100 to cause a predetermined motion, the "y" axis for the device precesses about the rotation axis 506. For an embodiment, this motion is programmed into the device 100 as a predetermined motion because it is more natural for a user to twist the device 100 about the rotation axis 506 in this way rather than aligning one or more twists with the "y" axis of the device 100. For a particular embodiment, a predetermined motion of the device 100 is a twisting motion of the device 100 about the rotation axis 506 passing through the device 100, wherein the twisting motion includes at least one of a forward rotation and a backward rotation about the rotation axis 506 or an angular jerk about the rotation axis 506 above a predetermined threshold.

Returning to FIG. 3 and continuing the description of the method 300, the device 100, in response to detecting a predetermined motion, measures 304 its orientation. An orientation of a device is defined as a position of the device relative to a direction or object. For different embodiments described herein, the device 100 measures its orientation relative to a gravitational direction, relative to a hand of a user holding the device 100, and relative to a head or face of a user holding the device 100. For each embodiment, the device 100 activates 306 a selectable hardware feature based on the measured orientation.

Turning again to FIG. 4, the activation of a selectable hardware feature based on an orientation of the device 100 measured with respect to a gravitational direction is described in greater detail. In FIG. 4, an orientation of the device 100 is measured relative to the gravitational direction 406 and a hardware feature is activated based on its relative location with respect to a plurality of selectable hardware features given the gravitational direction 406. The gravitational direction 406, in turn, is measured by the accelerometer 206 of device 100 either before or after the device 100 detects the predetermined screwdriver motion depicted by the diagram 400. In the embodiment portrayed by the diagram 400, a first selectable hardware feature is the first camera 108 on the front (first) side of the device 100 and a second selectable hardware feature is the second camera 110 (hidden from view) on the back (second) side of the device 100. The hardware feature the device 100 selects for activation is the highest hardware feature of the plurality of selectable hardware features (e.g., the two cameras) with respect to the gravitational direction 406. Embodiments for which the processing element 202 cannot reliably determine the highest selectable hardware feature are described with reference to FIG. 5.

The orientation of the device 100 is shown at 402 with its topside down. As a consequence, the location of the first camera 108 on the front side of the device 100 is higher with respect to the gravitational direction 406 than the location of the second camera 110 on the back side of the device 100, and the device 100 activates 306 the first camera 108. With the activation of the first camera 108, a user of the device 100 sees the images captured by the first camera 108 displayed by a viewfinder application on the display 106 of the device 100.

At 404, the orientation of the device 100 is with its topside up with respect to the gravitational direction 406 during and immediately after the user twists the device 100 to recreate the predetermined screwdriver motion. After detecting 302 the predetermined motion, the device activates 306 the second camera 110 because the second camera is now located above the first camera 108. In some instances, as the user holds the device 100 nearly horizontal while twisting it, a determination of which selectable hardware feature is higher becomes more difficult.

Turning again to FIG. 5, the polar angle 510 and an intersection angle 512 between a reference line 504, connecting the first location of the first camera 108 to the second location of a second camera 110, and the gravitational direction 502 provide indications of an inclination of the device 100 with respect to the gravitational direction 502. The orientation of the device 100 is measured relative to the gravitational direction 502 using the accelerometer 206 of the device, wherein the orientation is quantified by the intersection angle 512 between the gravitational direction 502 and the reference line 504, wherein the second location is above the first location with respect to the gravitational direction 502. The device 100 activates the second camera 110 if the intersection angle 512 is less than a threshold angle. The device 100 activates a default camera if the intersection angle is greater than the threshold angle, placing the device 100 in a more-horizontal position. In one embodiment, the default camera is the second camera 110. In another embodiment, the default camera is the first camera 108.

As shown in the diagram 500, the device 100 detects the predetermined screwdriver motion and consequentially measures its orientation while the "y" axis for the device 100 (which is aligned in this embodiment with the reference line 504 that connects the first 108 and second 110 cameras) is in the position shown. Depending on when the device 100 detects the predetermined motion, the reference line can be anywhere on a rotation cone indicated at 508 as the device 100 measures its orientation. The intersection angle 512 cycles as the reference line 504 precesses on the rotation cone 508. Therefore, the device 100 can measure an orientation anywhere on the rotation cone 508. In an alternate embodiment, the rotation of the device 100 is time averaged over an interval of time such that the device 100 measures an orientation that is represented by the polar angle 510 between the rotation axis 506 and the gravitational direction 502.

In another embodiment, the device 100 is orientated on the reference line 504 as indicated in the diagram 500 but with its topside down. In this orientation, the device 100 activates 306 the front camera 108 if it measures the intersection angle 512, or alternatively the polar angle 510, to be less than the critical angle. Otherwise, the device 100 activates 306 the second camera 110 as the default camera. For an intersection angle or a polar angle that is near 90 degrees, the device 100 is in an almost horizontal orientation with respect to gravity and its first 108 and second camera are at nearly the same height. When the processing element 202 cannot reliably determine which of the two cameras 108, 110 is the higher camera, it selects and activates a default camera. For an embodiment, the second camera 110 is the default camera.

For a particular embodiment in which the orientation of the device 100 is measured relative to the gravitational direction 502 using the accelerometer 206 of the device, the orientation is quantified by an orientation angle 514 between the gravitational direction 502 and the reference line 504 pointing from the location of the first camera to the location of the second camera. With the two vectors of gravitational direction 502 and reference line 504, when the orientation angle is 180 degrees, the device 100 is completely upright with the device y-axis opposing the gravitational direction 502. The device 100 activates the first camera if the intersection angle is less than a threshold angle, and activates the second camera if the orientation angle is greater than a threshold angle. In order to resolve ambiguous situations where the orientation angle is close to 90 degrees, the threshold angle may be set to 75 degrees, which means that the second camera is activated if the orientation angle is 75 degrees or greater.

Figure 6:
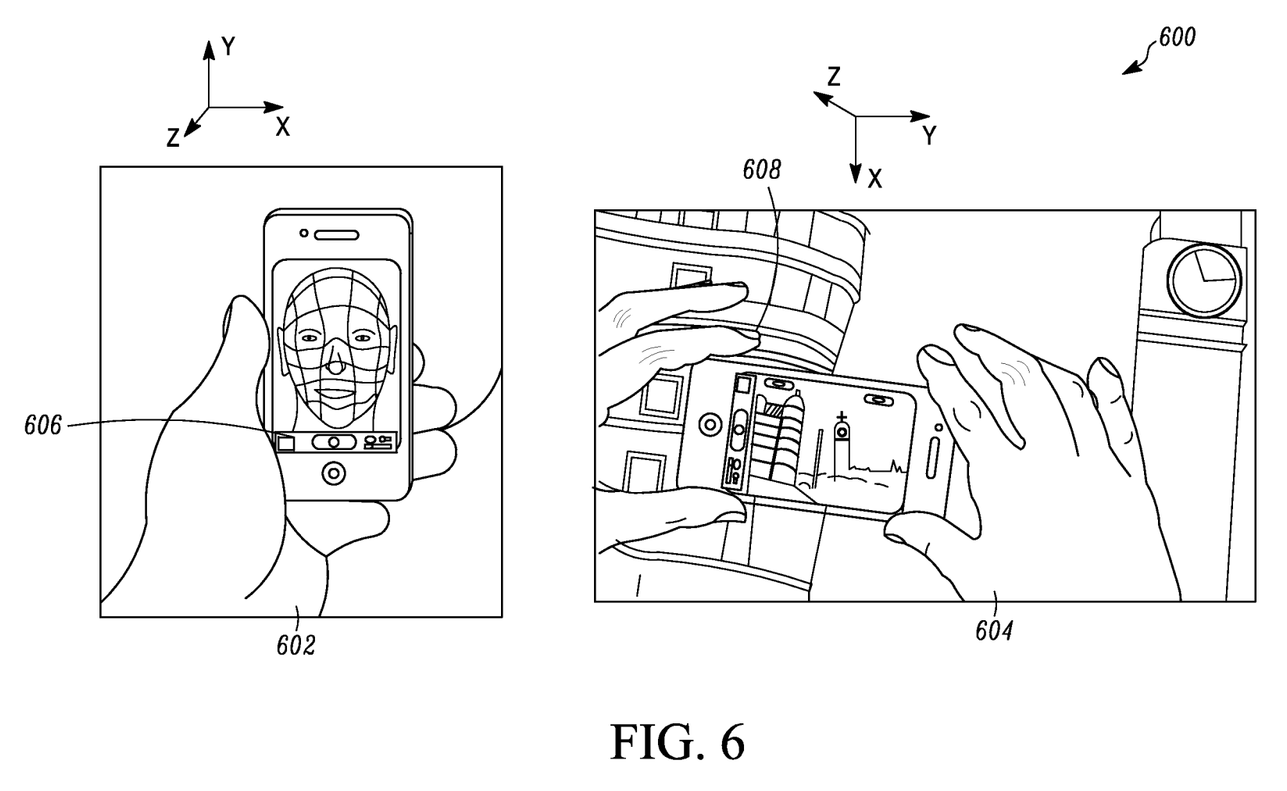
FIG. 6 shows a pair of diagrams illustrating different orientations for an electronic device relative to a grip on the device in accordance with some embodiments of the present teachings.

FIG. 6 shows a diagram 600 illustrating the device 100 measuring its orientation relative to a grip detected on the device 100 and the device 100 activating 306 a hardware feature based on its location with respect to the detected grip. More specifically, the diagram 600 shows two views of the device 100, one view at 602, where the device 100 is being held in a first grip 606 configuration, and another view at 604, where the device is being held in a second grip 608 configuration. Any number of grip configurations may be detected using the principles described. For one embodiment, a first location of a first selectable hardware feature of a plurality of selectable hardware features is on the first side of the device 100 and a second location of a second selectable hardware feature of the plurality of selectable hardware features is on the second side of the device 100. The device 100 activates 306 the first selectable hardware feature if the first grip 606 is detected on the device 100, and the device 100 activates 306 the second selectable hardware feature if the second grip 608 is detected on the device 100. With regard to the embodiment shown at 600, the first grip 606 is a palm grip on the second side of the device 100, and the first selectable hardware feature is the forward-facing camera 108 on the first side of the device 100. The second grip 608 is a fingertip grip on edges of the device 100, and the second selectable hardware feature is the rearward-facing camera 110 on the second side of the device 100.

For the first grip 606, the touch sensors 208 of the device 100 detect that the fleshy part of a user's hand between his palm and thumb is in contact with the lower-left edge of the device 100 while his thumb is also in contact with the left edge of the device 100 above where the base of the thumb is located. Additionally, the touch sensors 208 detect a pair of fingers grouped together on the lower-right edge of the device 100 and the smallest pinky finger contacting the bottom edge of the device 100. From the relative positions of the thumb and fingers, the device 100 detects that it is being palmed in the user's left hand. Based on this grip, which indicates preparation for a self-photograph ("selfie") or an intent to participate in a video call, the device 100 activates 306 the first camera 108. Of course, the parameters for detecting a palm grip may be set differently for a tablet (where the fingers may not reach an edge opposite the thumb or where two hands grip the lower corners in a symmetrical manner), a right-hand grip, or a grip that is likely to block a field of view for the second camera 110.

For the second grip 608, the touch sensors 208 of the device 100 detect that two thumbs are in contact with the bottom-right and top-right edge of the device 100 and that two single fingers are in contact with the bottom-left and top-left edge of the device 100. For a specific embodiment, the accelerometer 206 of the device 100 also detects that the device 100 is being held sideways with its left edge up. From the cumulative sensor data, the device 100 determines its orientation relative to the user's grip is that the device 100 is being held sideways between the user's thumbs and left and right forefingers. Based on this orientation, which is common to standard (non-self) picture-taking, the device 100 activates 306 the second camera 110.

In addition to or instead of the specific grips 606, 608 described above, the device 100 stores parameter data in its memory for other grips. While being held, and after a predetermined motion is detected, the device 100 compares data received by the touch sensors 208 to the stored parameter data for different grips. Based on a closest match, or alternatively, a sufficient match, between the measured touch-sensor data and the stored parameter data, the device 100 determines its orientation with respect to a grip and responsively activates 306 a camera (or other selectable hardware feature) in accordance with an algorithm being run by the processing element 202.

Figure 7:
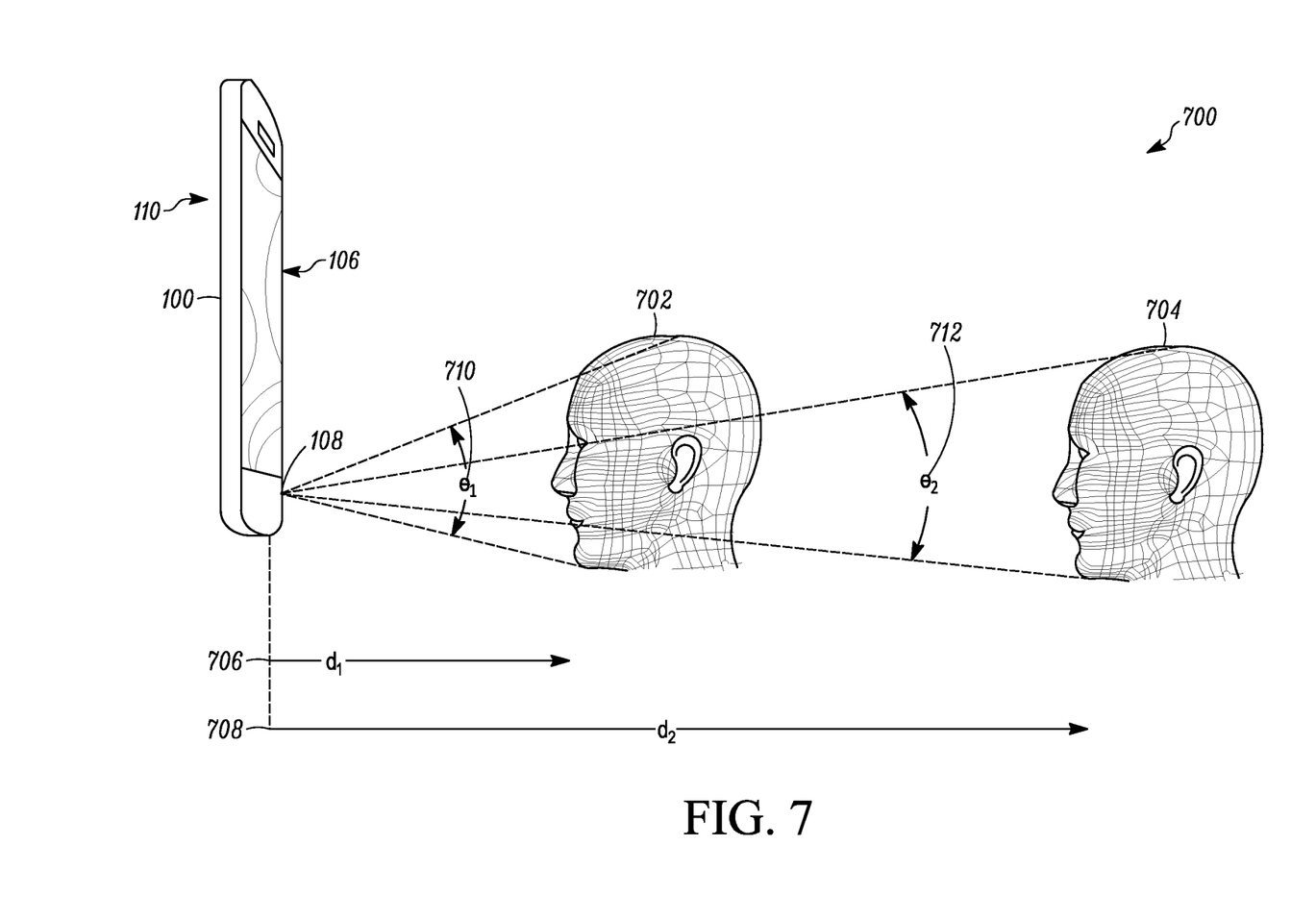
FIG. 7 is a schematic diagram illustrating an electronic device measuring an orientation in accordance with some embodiments of the present teachings.

For another embodiment as shown with reference to FIG. 7, a first selectable hardware feature of a plurality of selectable hardware features is the forward-facing camera 108 of the device 100 located with the display 106 of the device 100 on the first side of the device 100 and a second selectable hardware feature of the plurality of selectable hardware features is the rearward-facing camera 110 of the device 100 located on the second side of the device 100 opposite the first side, wherein the orientation of the device 100 is a proximity to a nearest human face, and the proximity is measured by the forward-facing camera 108. Embodiments for which the device 100 determines its orientation as relative to a face of a human head are described with reference to FIG. 7. FIG. 7 shows a diagram 700 of the device 100 positioned with its topside up. In front of its forward-facing camera 108 are two faces, a first face 702, located at a distance $d_1$ 706 in front of the front camera 108, and a second face 704, located at a greater distance $d_2$ 708 in front of the forward-facing camera 108. Although there are two human faces shown in FIG. 7, we shall consider a situation where only one face is available but at two different points in time (and at two different distances during those two points of time).

The device 100 is programmed to operate on the assumption that if a user intends to use the rearward-facing camera 110 on the back side of the device 100, he will position his face close to the display 106 of the device 100 to better view the image the viewfinder displays. Alternatively, if the user wishes to use the forward-facing camera 108 to capture his own image (i.e., take a "selfie"), the user positions his face further away from the forward-facing camera 108 so that the forward-facing camera 108 can completely frame his face, which would otherwise appear too large. Based on its distance from a face, the device 100 selects a camera for activation.

The forward-facing camera 108 is the selected feature if a distance between the forward-facing camera 108 and the face is greater than a threshold distance, and the rearward-facing camera 110 is the selected feature if the distance is less than the threshold distance, wherein the distance is measured using an autofocus feature of the forward-facing camera 108. For example, the device 100 uses its forward-facing camera 108 to bring the features of the face 702 into focus using the autofocus feature. From a focal length that is set when the face 702 is in focus, the device 100 determines the face 702 is located a distance $d_1$ 706 from the forward-facing camera 108. The device 100 determines the distance $d_1$ 706 is less than the threshold distance and therefore selects 306 the rearward-facing camera 110 for activation. For the face 704, the device 100 determines the distance $d_2$ 708 using the autofocus feature, further determines that the distance $d_2$ 708 is greater than the threshold distance, and selects 306 the forward-facing camera 108 for activation.

The forward-facing camera 108 is also selected if an angle subtended by the nearest human face relative to the forward-facing camera 108 is less than a threshold angle, and the rearward-facing camera 110 is the selected feature if the angle subtended by the nearest human face relative to the forward-facing camera 108 is greater than the threshold angle. The angle subtended by a face is a linearly decreasing function of the distance of the head from the forward-facing camera 108. If the distance d2 708 is three times the distance d1 706, then the angle $\theta_2$ 712 is a third of the angle $\theta_1$ 710. The device 100 determines the angles $\theta_1$ 710 and $\theta_2$ 712 from how much area a nearest face 702 or 704 occupies of a framed area for the forward-facing camera 108.

Figure 8:
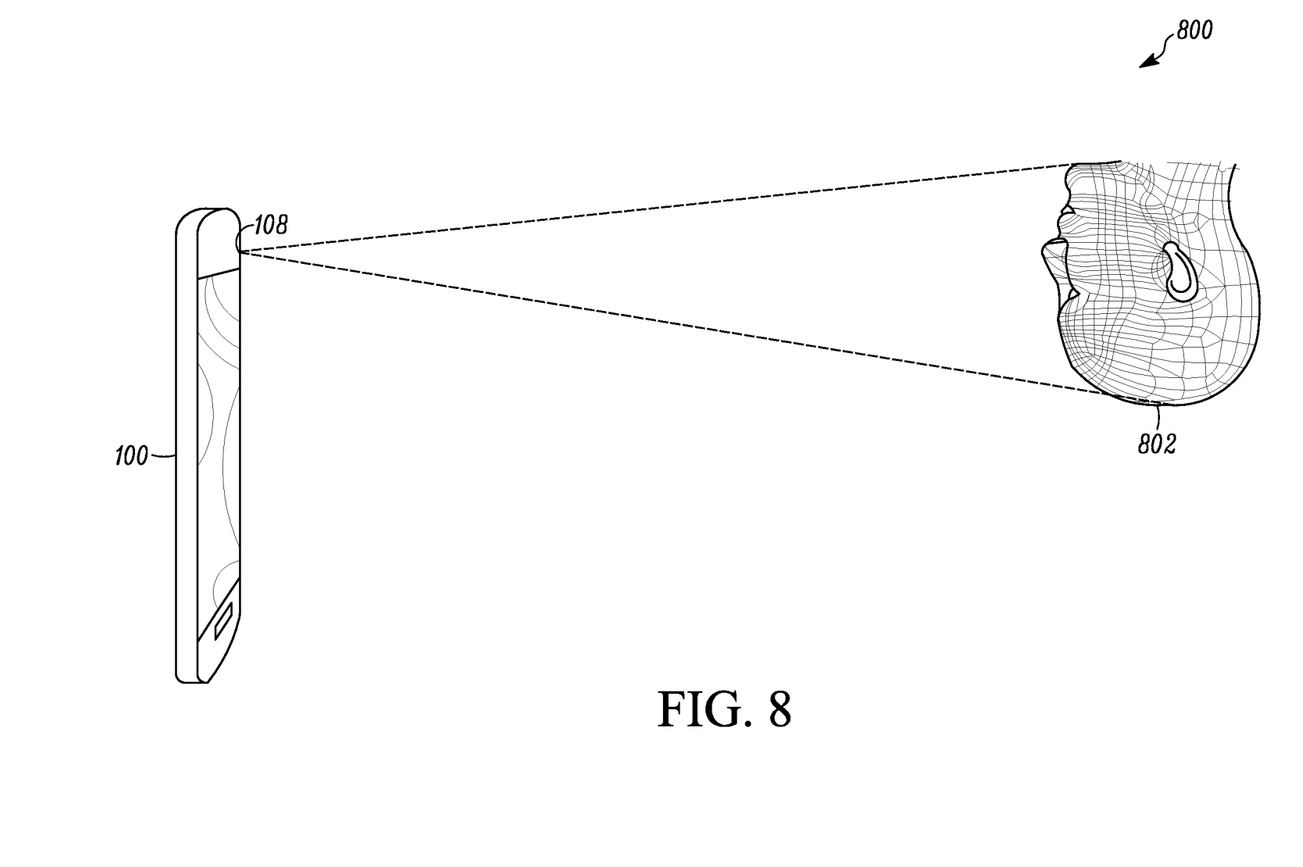
FIG. 8 is a schematic diagram illustrating an electronic device measuring an orientation in accordance with some embodiments of the present teachings.

For some embodiments, the device 100 determines its orientation by its position relative to a face rather than by its distance from the face. Such an embodiment is described with reference to FIG. 8. FIG. 8 shows a diagram 800 illustrating the device 100 in a topside-down orientation. In front of the forward-facing camera 108 of the device 100 is a face 802. The processing element 202 is configured to select the first camera 108 if the device 100 is in a first orientation relative to an image of the nearest human face 802 detected by the first camera, and processing element 202 is configured to select the second camera 110 if the device 100 is in a second orientation relative to the image of the nearest human face 802 detected by the first camera. For example, the device 100 selects the forward-facing camera 108 for activation if an image of the nearest human face 802 as captured by the forward-facing camera is upside down. The device 100 selects the rearward-facing camera 110 for activation if the image of the nearest human face 802 captured by the forward-facing camera is right-side up.

As shown at 800, the face 802 appears to the front camera 108 of the device 100 to be upside down. This occurs, for example if a user is standing upright while holding the device 100 topside down. Alternatively, the user can be upside down and be holding the device 100 topside up. The device 100 determines its orientation relative to the face 802 by determining the relative position of facial features on the face 802 (e.g., eyes, nose, mouth, etc.). When the device 100 detects that it is orientated opposite to the face 802 of the user, it activates 306 its forward-facing camera 108. After the forward-facing camera 108 is activated, the user can reorientate the device 100 by rotating it to capture images that are right-side up. The orientation of the device 100 as shown at 800 is distinguished from the orientation of the device 100 as shown at 402 in that at 402, the device 100 is upside down relative to gravity, whereas, at 800, the device 100 is upside down relative to a user's face (and need not be upside down with respect to gravity).

Figure 9:
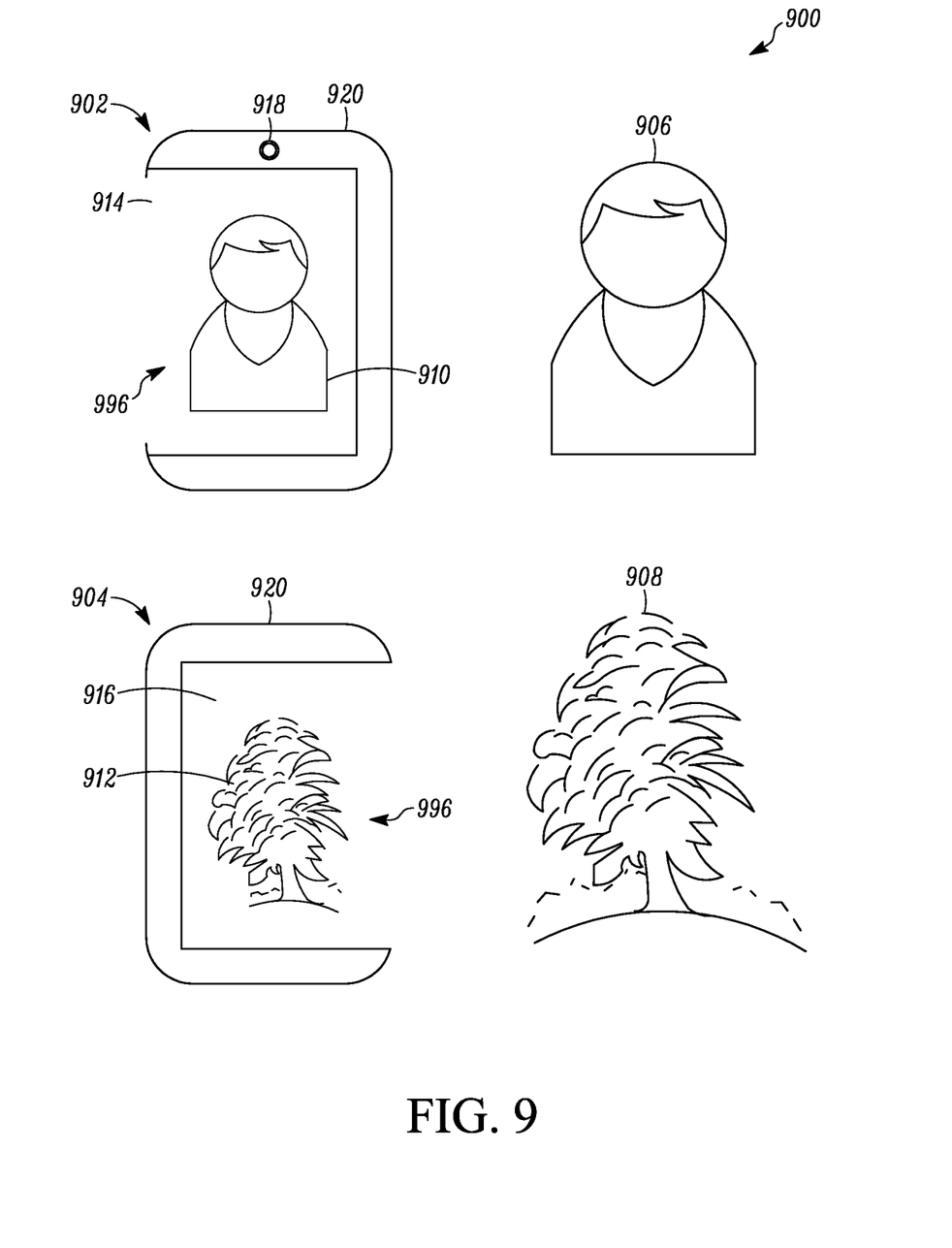
FIG. 9 shows a pair of schematic diagrams illustrating two orientations of an electronic device with a wraparound display in accordance with some embodiments of the present teachings.

FIG. 9 shows a pair of schematic diagrams at 900 illustrating two orientations of an electronic device 920 with a wraparound display 996 in accordance with some embodiments of the present teachings. Because the device 920 has a display 996 that is viewable from both sides of the device 920, the device 920 only has one camera 918. A viewfinder application for the camera 918 can be viewed from either side of the device 920. A plurality of selectable hardware features, therefore, includes a first 914 and a second 916 side of the wraparound display 996. Whichever side of the display 996 the device 920 activates is the side of the display the device 920 outputs images from the viewfinder application of the camera 918.

In a camera-forward orientation, shown at 902, the camera 918 faces a user 906 positioned in front of the camera 918. The camera 918 captures an image 910 of the user 906, and the device 920 determines that its orientation is with its front side facing the user 906. Based on this orientation, the device 920 activates 306 the front side 914 of the wraparound display 996 for displaying images captured by the camera 918 so the user can see them.

In a camera-rearward orientation, shown at 904, the camera 918 faces away from the user 906 and toward a tree 908. The camera 918 captures an image 912 of the tree 908, and the device 920 determines that its orientation is with its front side facing away from the user 906. Based on this orientation, the device 920 activates the back side 916 of the wraparound display 996 for displaying images captured by the camera 918 so the user 906 can see them.

As described with respect to FIG. 7, the calculation of focal distances or angles of a closest face may be used to select which side of a wraparound display 996 to activate as a viewfinder.

For additional embodiments that are in accordance with the present teachings, an electronic device, taken to be the device 100, in response to detecting a predetermined motion, measures its orientation using multiple sensors and/or elements of different types. The device 100 uses data gathered by each of the multiple sensors and/or elements to determine its orientation. For example, the device 100 determines that it is being held sideways between a user's left thumb and index finger at a particular distance from the user's head. The device 100 makes this orientation determination from compiled data obtained by the accelerometer 206, the touch sensors 208, and the front camera 108.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic device comprising:
a first camera located on a first side of the electronic device at a first height above a bottom of the electronic device the bottom being a short edge of the electronic device;
a second camera located on a second side of the electronic device at a second height above the bottom of the electronic device, wherein the second height is different than the first height;
a first sensor configured to detect a motion of the electronic device;
a second sensor configured to measure an orientation of the electronic device; and
a processing element operationally coupled to the first and second sensors and the first and second cameras, wherein the processing element is configured to:
detect a predetermined pattern of directional movement of the electronic device;
measure, in response to detecting the predetermined pattern, the orientation of the device relative to a gravitational direction, wherein the orientation is quantified by an orientation angle between the gravitational direction and a reference line pointing from a first location of the first camera to a second location of the second camera and
electronically select and activate one of the first camera or the second camera based on the orientation angle of the electronic device measured relative to the gravitational direction and relative height between the first camera and the second camera with respect to the gravitational direction in response to detecting the predetermined pattern.

2. The electronic device of claim 1, wherein the first sensor comprises:
a gyroscope, and
wherein the predetermined pattern is rotational motion resulting from twisting the electronic device, and comprising a reversal of direction and an angular jerk above a threshold value.

3. The electronic device of claim 1, wherein:
the second sensor comprises an accelerometer that measures the orientation of the electronic device relative to the gravitational direction, and
wherein the processing element is configured to:
select the first camera instead of the second camera when the orientation angle is less than a threshold angle; and
select the second camera instead of the first camera when the orientation angle is greater than the threshold angle.

4. A method performed by an electronic device for activating hardware features of the electronic device, the method comprising:
detecting a predetermined pattern of directional movement of the electronic device, the electronic device comprising a plurality of selectable hardware features;
measuring, in response to detecting the predetermined pattern, an orientation of the electronic device relative to a gravitational direction, wherein the orientation is quantified by an orientation angle between the gravitational direction and a reference line pointing from a first location of a first selectable hardware feature of the plurality of selectable hardware features to a second location of a second selectable hardware feature of the plurality of selectable hardware features, wherein the first location is at a different height than the second location from a short edge of the electronic device; and
activating one of the first selectable hardware feature or the second selectable hardware feature based on the measured orientation angle of the electronic device with respect to the gravitational direction and relative height between the first selectable hardware feature and the second selectable hardware feature with respect to the gravitational direction in response to detecting the predetermined pattern.

5. The method of claim 4, wherein the predetermined pattern of the electronic device is a twisting motion of the electronic device about a rotation axis passing through the electronic device, wherein the twisting motion comprises at least one of:
- a forward rotation and a backward rotation about the rotation axis; or
- an angular jerk about the rotation axis greater than a predetermined threshold.

6. The method of claim 4, wherein
- the orientation of the electronic device is measured relative to a gravitational direction using an accelerometer of the electronic device, and
- the first selectable hardware feature is activated if the orientation angle is less than a threshold angle; and
- the second selectable hardware feature is activated if the orientation angle is greater than the threshold angle.

7. The method of claim 6, wherein the first selectable hardware feature is a first camera on a first side of the electronic device and the second selectable hardware feature is a second camera on a second side of the electronic device opposite the first side.

* * * * *